United States Patent [19]

Snyder et al.

[11] Patent Number: 5,522,039
[45] Date of Patent: May 28, 1996

[54] CALCULATION OF NETWORK DATA CHECK SUMS BY DEDICATED HARDWARE WITH SOFTWARE CORRECTIONS

[75] Inventors: Robert D. Snyder, San Jose; Paul R. Zimmer, Citrus Heights; Michael I. Thompson, Rocklin; Paul T. Congdon, Sacramento; K. Monroe Bridges, III, Fremont, all of Calif.

[73] Assignee: Hewlett-Packard Company, Palo Alto, Calif.

[21] Appl. No.: 118,959

[22] Filed: Sep. 9, 1993

[51] Int. Cl.[6] ............................. G06F 13/12; G06F 13/14; G06F 11/10
[52] U.S. Cl. ............................. 395/185.05; 364/DIG. 1; 364/DIG. 2; 364/265; 364/265.1; 364/266; 364/266.3
[58] Field of Search ....................... 364/DIG. 1 MS File, 364/DIG. 2 MS File; 395/200, 250, 500, 800, 200.01, 200.02, 200.07, 200.17, 180, 182.02, 182.16, 182.19, 185.02, 185.05; 371/48, 49.1, 49.2, 49.3, 49.4

[56] References Cited

U.S. PATENT DOCUMENTS 5,430,842  7/1995  Thompson et al. ................ 395/200.17

OTHER PUBLICATIONS

Andy DeBaets, et al., "High Performance Pa–Risc Snakes Motherboard I/O", Feb. 22–26, 1993, pp. 433–440 IEE Computer Society Press Reprint. IEEE Computer Society Technical Committee On Computer Graphics.

Primary Examiner—Robert B. Harrell

[57] ABSTRACT

A method and apparatus are presented for an improved data transferring technique between a network and a computing system. A network adapter implements a data transfer from a network to the memory of a destination computing system, accumulating a checksum of all data transferred. The dedicated hardware allows data to be transferred through it and a checksum to be accumulated without intervention by the processor of the destination computing system. Software corrections can generate a checksum of the header data and then generate a net checksum by subtracting the header checksum from the gross checksum accumulated by the dedicated hardware, thus achieving the desired result with minimal intervention by the processor of the destination computing system.

15 Claims, 4 Drawing Sheets

CALCULATION OF NETWORK DATA CHECK SUMS BY DEDICATED HARDWARE WITH SOFTWARE CORRECTIONS

FIELD OF THE INVENTION

The present invention relates to computer network technology generally, and more particularly to an integrated hardware and software implementation of an improved technique for transferring data to and from a computing system connected to a computing network and verifying the accuracy of the data transferred.

BACKGROUND OF THE INVENTION

The present invention concerns a hardware system which transfers a packet of data from a computing network to a computer system connected to that network.

In processing network data, a significant portion of system resources such as central processing utilization, bus bandwidth, board space, and cost is devoted to the task of data copying for the purposes of splitting network header information from the user data and calculating a data checksum for the data portion of a packet transferred from the network. The checksum calculated at the receiving computing system is compared with a checksum from a transmitting computing system, such as a network server, for verifying the accuracy of the data received.

By making appropriate hardware and software tradeoffs, the present invention implements an inexpensive compact solution that greatly reduces the percentage of system resources devoted to the copying and checksumming of data.

In a computing system connected to a network, data is transferred from the network to the computing system and from the computing system to the network in groups of bytes known as packets. A packet contains a header which includes the size of the header, length of the user data in the packet, packet type and other information about the group of data which is to follow. Following the header is a group of user data which represents the information actually desired to be transferred from the network to the computing system or from the computing system to the network. Furthermore, in many computing systems it is necessary to transfer protection and ownership of just the user data from the operating system to the user, while maintaining header data under operating system control. Many computing systems assign such protection and ownership with granularity equal to the size of a memory page typically several thousand bytes.

Several approaches to data transfer between a computing system and a network have been implemented in the past. One of the prior approaches for the transferring of network data is implemented as follows: A processor moves all data from a network adapter via directed input/output. While moving the data from the network adapter to system memory, the processor creates a checksum of all of the data. If protection and ownership transfer is desired, the processor must also copy the user data to another location in memory. This implementation requires the CPU to intervene substantially and control the entire data transfer, thus occupying the processor and making it unavailable to perform other tasks.

Another implementation involves a network card moving the data into system memory via direct memory access (DMA), and a processor then performs a checksum and copies the data into user space. Although the approach eliminates some of the time that the processor would otherwise need to devote to directed input/output, this solution is far from optimal.

In yet a third prior implementation, a microprocessor or other agent on a network adapter parses the stream of data from the network, calculates a split in the packet between the header data information and the substantive data information, inserts data checksums into the packet based on this information, and transfers data to and from main memory via direct memory access. This approach has quite good performance; however it is costly, takes up significantly greater quantities of board space, and does not scale well with the speed of the microprocessor.

Therefore, it would be desirable to implement an efficient method for network data transfer using a balance of dedicated and semi-dedicated hardware with appropriate software-based correction algorithms to increase efficiency without a substantial increase in cost.

BRIEF SUMMARY OF THE INVENTION

The present invention provides a solution to the problem of central processor unit (CPU) over-utilization in network data transfers. The present invention utilizes a dedicated hardware control chip and a data path chip in conjunction with a software based CPU correction algorithm.

A packet of data is transferred from a source computing system to a destination computing system. A typical packet has a header data portion and a user data portion. A checksum of the user data portion of the data packet is calculated at the destination computing system. A data packet is received from the source computing system, and transferred to a memory of the destination computing system. At the same time a gross checksum of data received is calculated at the destination computing system. A header checksum of the header data portion of the data packet is calculated and a net checksum is generated by subtracting the header checksum from the gross checksum. The CPU is used only for calculating the header checksum and can be used for other tasks during data receipt.

For example, when a block, or packet, of data is to be transferred from the network, the central processing unit and its corresponding software driver first program a control chip to transfer the first portion of the packet to system memory. The control chip then directs a transfer of the first portion of the network data packet which comprises the header and possibly some substantive user data, to system memory. During the transfer, the data flows through the data path chip, which accumulates a checksum of all of the bytes passing through it, without regard to whether the bytes are header or substantive user data.

After the transfer of the first block of data, the control chip interrupts the central processing unit which reads the data just transferred to determine the packet type and, correspondingly, the point at which the header information stops and the substantive data begins. The CPU then copies any substantive data which was direct memory access transferred along with the header, to the beginning of a new page in memory. The CPU then instructs the control chip to transfer the remainder of the network data packet from the network to system memory beginning at the point in system memory immediately following the location of any substantive data which may have been transferred along with the packet header and copied by the CPU to a new page in memory.

As with the first portion of the packet, the control chip, a DMA engine, moves data through the data path chip which continues to accumulate the checksum for all of the remaining data, which is a continuation of the checksum which was accumulated during the first portion of the packet transfer. After the entire packet is transferred and resides in system memory with the header data in one portion of system memory and the substantive data at the top of a new page in memory, the CPU/software driver calculates a checksum for the header portion of the data packet and subtracts that result from the total checksum generated by the data path chip, thus yielding the desired result—a checksum of the bytes of user data in the packet.

Now, to complete the transfer from the network to the user, the CPU can simply remap the substantive user data which has just been transferred from the network, and consequently, transfer protection and ownership of the data to the ultimate user.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
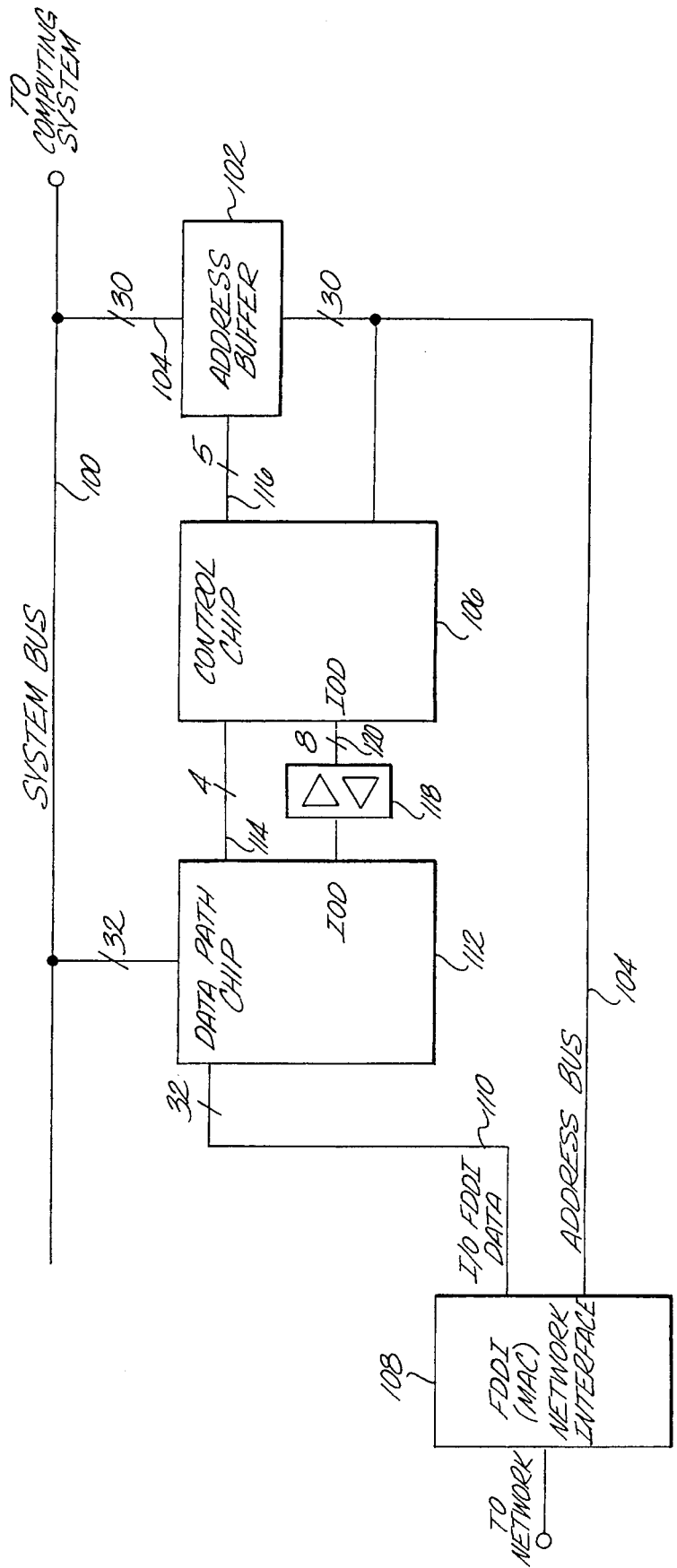
FIG. 1 is a block diagram of a network adapter.

FIG. 1 displays a block level diagram of a network adapter connected via a system bus 100 to a computing system. The receiving computing system may be a PC connected to the network, a file server, printer workstation or other user of data. Similarly, the computing system that is the source of the data packets on the bus may be selected from the same types of apparatus.

In an exemplary embodiment, the system bus is a Standard Graphics Connection (SGC) bus. The system bus is connected to an address buffer 102 by an address bus 104 which comprises thirty data lines. The address bus is also coupled to a control chip 106 and a FDDI network interface 108. The network interface provides the necessary protocol and data manipulations for interfacing to a network. In a preferred embodiment it is implemented using the AMD FDDI chip set available from Advanced Micro Devices, Sunnyvale, Calif.

The network interface is connected via a data bus 110 to a data path chip 112. The data path chip is responsible for transferring data from the network interface to the system bus and, consequently the computing system memory, under the direction and control of the control chip via four data path control lines 114. These data path lines include an FDDI Reset line used to reset the data path chip, a Local Data Enable line used to enable data through the data path chip, an FDDI Direction line used to indicate the direction of flow of data— either to the computing system or to the network— through the data path chip, and FDDI Checksum Read used to instruct the data path chip to send its accumulated checksum over the system bus. Other control lines, functional features and the like may be present in specific implementations of the invention and need not be described for a complete understanding of the invention.

The control chip, in addition to controlling the transfer of data through the data path chip, also controls the access of the network interface and the data path chip to the system bus and sets the appropriate control lines via the address control bus 116 to effect the proper addressing for the data on the system bus for and during any memory transfers. The control chip also controls addressing of the memory when the network adapter is receiving data from the main computing system and outputting it to the network via the network interface. The addressing functions are performed in a conventional manner.

The data path chip and the control chip are also connected via a bi-directional data buffer 118 and eight data lines 120.

Figure 2:
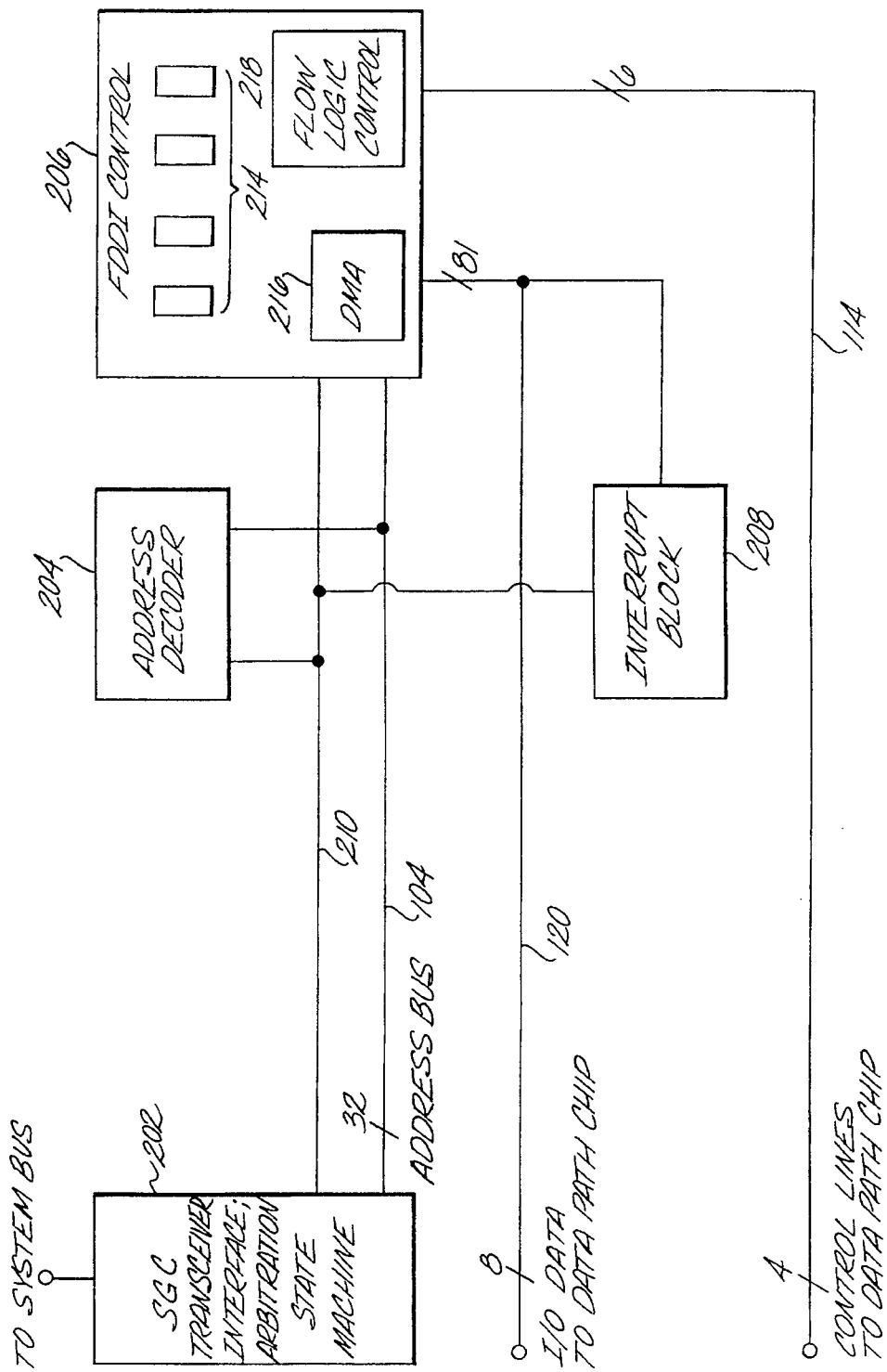
FIG. 2 is a block diagram of a control chip within the network adapter.

FIG. 2 is a block level diagram of the control chip 116. It comprises a system bus transceiver interface block and arbitration state machine 202, an address decoder 204, an FDDI control block 206, and an interrupt block 208. The address decoder is interconnected with the interrupt block, the FDDI control block and the system bus transceiver interface block 202 by an address decode bus 210. The address decode bus comprises two control lines, namely an Address Decode line, and a Select/Ready line. The address decoding function is implemented in the conventional manner and may be arranged so as to meet the system specifications of the particular computing system on which the present invention is to be practiced. In addition, the address decoder block is connected to the FDDI control block and the system bus transceiver interface via a thirty bit address bus 104 which is in turn connected to the network interface and the address buffer block as shown in FIG. 1.

The interrupt block and the FDDI control block are interconnected by an eight byte data bus 120 which is also connected to the data path chip 112 as shown in FIG. 1.

The system bus transceiver interface 202 monitors the system bus for activity relevant to the network adapter. When a relevant transaction occurs, the system bus transceiver interface informs the address decoder block and the FDDI control block, which in turn process the transaction appropriately. The FDDI control block also provides the control signals on the control bus 114 to the data path chip, directing the data path chip to transfer data in the appropriate quantity, destination, path and direction. The FDDI control block also includes two pairs of registers 214, each pair capable of storing an address in the destination computing system memory and a byte count. The FDDI control block includes a direct memory access (DMA) driver 216 which is capable of moving data from an input directly to the memory of the destination computing system without intervention by the processor of the destination computing system. Finally, the FDDI control block contains the appropriate logical circuitry 218 for monitoring and controlling the flow of data from the network, within the network adapter and the data path chip, and to the destination computing system.

The arbitration state machine 202 ensures that the network adapter has bus ownership when it is required for a network transaction. In the event that the network adapter were to require the bus for more than one of its own functions, the arbitration state machine would prioritize the local bus requests while requesting system bus ownership globally. This function would be necessary if, as is the case in a preferred embodiment, the control chip were to process input/output from more than one source, e.g., SCSI, fast-wide SCSI, CD Audio, etc. in addition to processing FDDI input/output.

Figure 3:
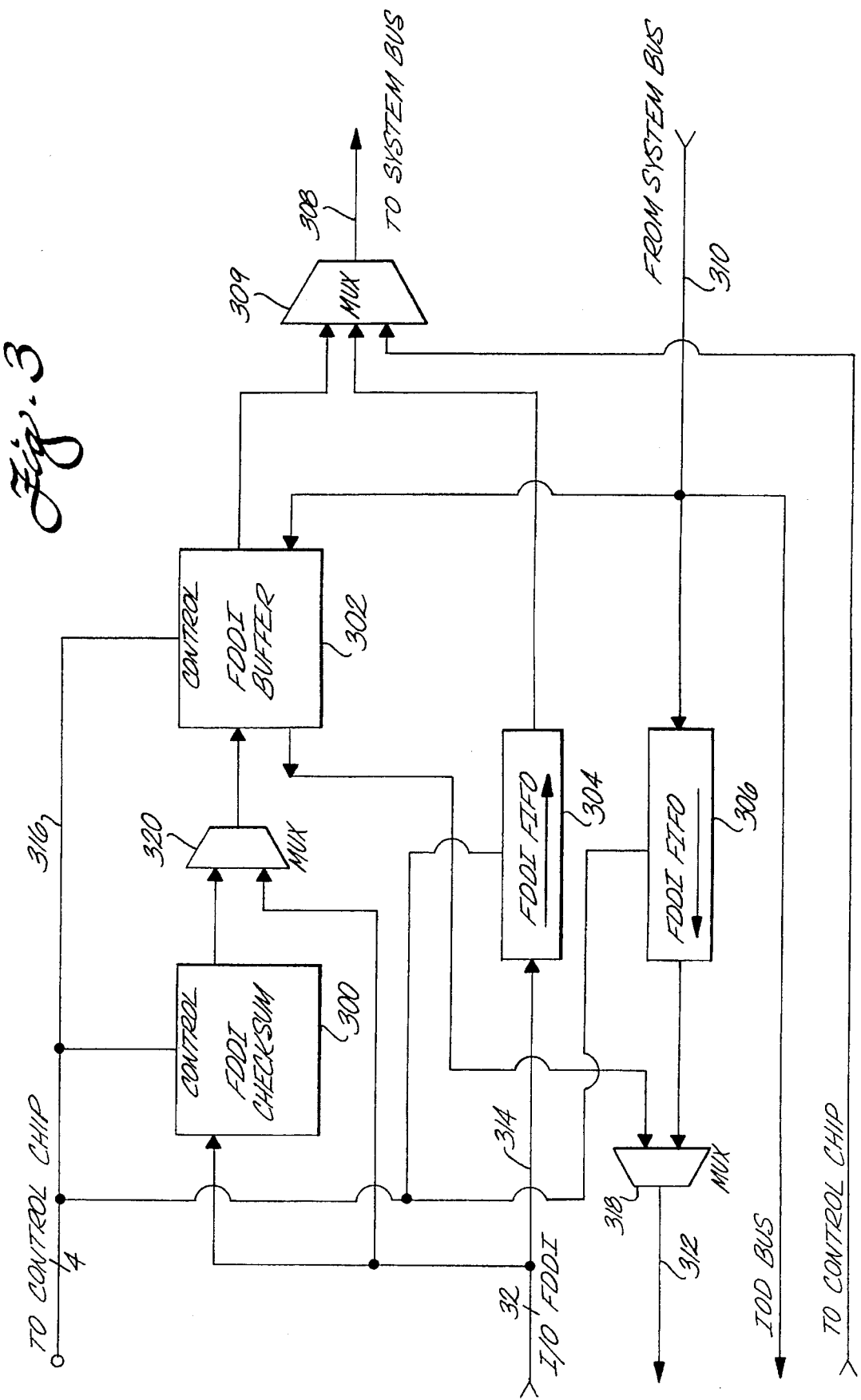
FIG. 3 is a block diagram of a data path chip within the network adapter.

FIG. 3 is a block level diagram of the data path chip 112 from FIG. 1. Depicted are an FDDI checksum block 300, an FDDI buffer 302, two FDDI FIFOs 304 and 306, and an interconnection 308 to the system bus from a multiplexer 309 which receives inputs from the FDDI buffer, the FDDI FIFO 304 and from the IOD data bus interconnection 322 from the control chip. Also present is an interconnection 310 from the system bus to an FDDI FIFO 306, which is in turn connected to the input of a multiplexer 318. The multiplexer 318 also receives an input from the FDDI Buffer, and outputs via an interconnection 312 to the network interface block. An interconnection 314 from the network interface block is connected to the input of one of the FDDI FIFOs 304, to the FDDI Checksum block 300 and to the input of a multiplexer 320. The multiplexer 320 also receives an input from the FDDI Checksum block and outputs to the FDDI Buffer. An interconnection 316 from the control chip with the four previously discussed control lines is connected both to the FDDI Checksum block, the FDDI Buffer block and the FIFOs. As with the control chip, additional network adapter functions may be included on the data path chip.

When the control chip 106 wishes to implement a transfer to or from the network, it executes the transfer through the data path chip. When the transfer is from the system bus to the network, the data passes from the system bus to the FDDI buffer for the network interface control functions, or is loaded into an FDDI first-in-first-out (FIFO) memory for actual network data. In a typical embodiment the FIFO is a twenty-two word memory with four bytes per word, for a total of eighty-eight bytes. The FIFO is primarily a speed matching device, since the system bus in a preferred embodiment is capable of much faster data transfer than is the network interface. Twenty-two words are loaded very quickly into the FIFO, and system bus ownership is released. The data will then be channelled through to the network interface at its desired speed without unnecessarily occupying and slowing the system bus and, therefore, allowing the system bus to execute other transactions within the computing system. Data comes out of the FIFO memory 306 and into a multiplexer 318 which selects between data from the FIFO memory and data from the FDDI buffer.

When a data transfer is to occur from the network to the system bus and consequently the memory of the computing system, data comes into the data path chip from the network interface on an I/O FDDI data bus 314 and goes through the FDDI checksum block into a multiplexer 320 and into an FDDI FIFO 304 similar to FDDI FIFO 306. This output FDDI FIFO 304 provides first-in-first-out memory speed matching for transactions from the network interface to the system bus, and consequently, twenty-two words of data can be loaded at the slower network rate and output quickly to the system bus, thus not occupying the bus for an unnecessarily long period of time, and allowing the system bus to execute additional transactions instead of waiting for the slower network interface.

The multiplexer 320 selects input to the FDDI buffer block 302 from the FDDI checksum block and via the I/O FDDI bus 314 from the network interface. The FDDI buffer block controls and regulates the flow of data within the data path chip; at the same time, the FDDI checksum block accumulates a checksum, at the direction of the control bus lines from the control chip. Thus, the FDDI checksum block enables the network adapter to generate a checksum of all inbound data, regardless of whether it is header data or user data, while the data packet is being transferred from the network interface to the system bus and from the bus to memory. Thus, the network adapter performs a desired and often critical operation without necessitating intervention or calculation by the processor of the destination computing system and hence frees up the processor to perform other tasks. Previously, the CPU was occupied during data transfer for accumulating a checksum. That task is now performed at the network adapter level.

The packet of data on a network contains a header portion of data which contains information regarding the length of the packet, the type of packet, the type of header, and other useful information. Depending on the type of header, it may occupy the first few dozen bytes up to a hundred bytes or more. A network data packet also contains a user data portion which contains the information actually desired to be transferred from the network to the computing system or from the computing system to the network.

It is instructive to note that studies of typical network traffic suggest a bimodal distribution of packet length. That is to say, most packets will be either "very large" or "very small," where large is interpreted as a number of bytes per packet approaching the maximum allowed by the protocol (typically in the thousands), and small is a number of bytes per packet not much greater than the minimum allowed (typically in the low hundreds). Large packets tend to be associated with such activities as file transfer, while small packets tend to be associated with maintenance and information about the network itself.

Figure 4:
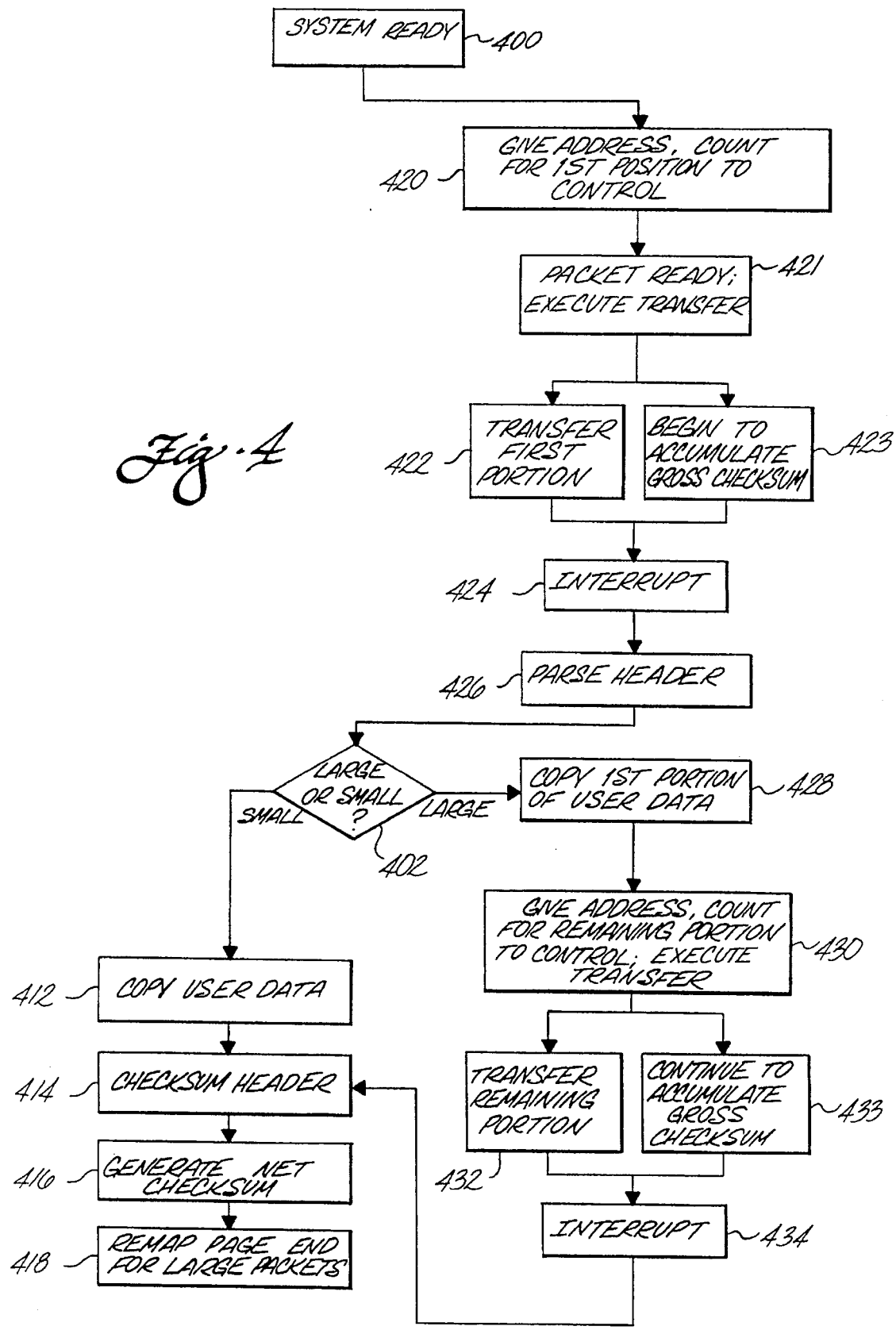
FIG. 4 is a flow diagram of the functionality of a preferred embodiment of the present invention in implementing a transfer of data from a network to a computing system.

FIG. 4 is a flow diagram indicating the steps taken by the network adapter and its computing system in receiving a packet of data from the network. When the system is ready to receive packets, 400, the processor gives the destination address and byte count of a first portion of the packet to the network adapter and the control chip, and enables the network adapter, and specifically the control chip, to execute a transfer 420. Note that in no case is it possible to anticipate the exact size or arrival time of any given incoming packet. The control chip stores the destination address and the byte count in one of its two pairs of address and byte count registers. The byte count may be adjusted by the software driver to take advantage of the bimodal distribution mentioned above. This number should be chosen such that the majority of "small" packets are moved on the first transfer with a single interrupt. A tradeoff is made between the desire to capture as many "small" packets as possible while at the same time avoiding excessive copying on large packets, which operation is explained below. Selection of the optimum value will depend on the characteristics of the computing system and of the network.

Thus, the CPU selects an appropriate number of bytes for the byte count based on a number of bytes large enough to receive the header portion of a typical network data packet and possibly some bytes of user data. For example, the CPU may always set a byte count of 256 for the first portion transfer. If the header for a specific transfer protocol has only 76 bytes, there will be 180 bytes of user data transferred to memory along with the 76 byte header. When data arrives, 421, the control chip then directs the transfer of the first portion of the packet and directs the data path chip to accumulate a gross checksum of all data contained within the first portion of the packet during the transfer to the memory of the destination computing system 422, 423.

When the first portion of the packet has been transferred to the memory of the destination computing system, the control chip interrupts the CPU of the destination computing system and informs it of the status of the transfer 424. The processor then analyzes the data which has just been transferred 426, reads the header data, which is now in its memory, to determine the type of packet and the ending point of the header data and consequently the beginning point of the user data. Then, based upon whether the entire packet is now in host memory, the processor and network adapter proceed accordingly.

If the entire packet is now in host memory, the processor then copies the user data portion of the transferred packet to the beginning of a user page in memory 412. With different implementations of a computing system the copying of user data may or may not be useful in the practice of the present invention. The processor then generates a checksum of the header data portion of the transferred packet by adding together all of the data in the header portion 414. The CPU then generates a net checksum 416, which is the desired checksum of all of the user data, by subtracting the recently calculated header checksum from the gross checksum which was generated by the data path chip during the transfer of the packet from the network to the memory of the destination computing system. When the amount of user data comprises a smaller number of bytes than the header, it may be more efficient to bypass the present invention by directly performing a checksum on the user data only, rather than calculating a net checksum.

A checksum has therefore been generated over all of the user data and can be verified with the network in order to determine the accuracy of the data transfer. Instead of independently calculating a checksum over all of the user data, the processor needs only to calculate the checksum of header data portion which is typically smaller than the user data portion and simply subtract the header checksum from the gross checksum generated by the network adapter to achieve the desired result. Hence, the processor is occupied for a smaller amount of time, and network data transfer efficiency is thereby improved.

When a packet to be transferred from the network is larger than the (preprogrammed) number of bytes for the first portion transfer mentioned above, the entire transfer is executed by the network adapter in two phases. The first operations are performed the same as for a small packet 420, the CPU of the destination computing system gives the destination address in its memory and a byte count for the first portion of the packet to the control chip of the network adapter and instructs the control chip to execute the transfer.

The control chip and the data path chip then transfer the first designated portion of the network data packet to the appointed address in memory 422. While the transfer of the first portion is taking place, the data path chip independently accumulates a checksum of all of the data transferred 423 without occupying the processor of the destination computing system, in the same manner as for a small packet transfer.

After the first portion of data is transferred and the first portion of the gross checksum has been accumulated by the data path chip, the network adapter interrupts the processor of the destination computing system 424 and informs it of the completed status of the first portion transfer. The processor then looks to its memory and parses the information contained in the header data portion of the network packet which has just been transferred, along with possibly some user data 426.

The processor, based on the information contained in the header, can locate the end of the header data portion and the beginning of the user data portion of the recently transferred data and, if the entire packet is not in host memory, 402, copy that first portion of the user data which was transferred along with the header to a new page in memory 428. As mentioned earlier, various computing systems have varying structures for memory and the step of copying the first portion of the user data to a new page in memory may or may not be necessary or useful, based on the structural organization of the destination computing system.

The processor next instructs the control chip of the network adapter to transfer the remaining portion of the network data packet to memory immediately following the end of the portion of user data, if any, which was "inadvertently" transferred along with the header data portion. The processor gives this address and the byte count for the remaining portion to the control chip and instructs the control chip to execute the transfer from the network to memory 430. The control chip, in conjunction with the data path chip, as mentioned previously, then transfers the remaining portion of the network data packet 432, which is all user data, to the designated address in memory and, at the same time independently accumulates the gross checksum 433 which was begun in step 423. During this step, of course, the processor is unoccupied and available to execute other tasks within the computing system 432. At the end of the transfer the network adapter and the control chip interrupt the processor to inform it of the completed status of the transfer 434.

The processor then analyzes the header information which is in memory and generates a checksum of the header by adding together all of the bytes of the header 414. The processor can then generate a net checksum 416 by subtracting the header checksum, recently calculated, from the gross checksum which is forwarded by the data path chip on the network adapter. The net checksum of the user data is compared with the checksum of the packet source— either a network or another computing system—in a conventional and convenient manner.

By the above procedure, the packet of data has been transferred from the network to the memory of the destination computing system with very little intervention on the part of the processor, thus leaving it free to perform other tasks during the data transfer. In addition, very little of the user data portion needs to be recopied by the processor to a different location in memory as the information was transferred to the beginning of a new page by the network adapter and the processor can now simply remap that page 418 to transfer protection and ownership of it to the user.

This same invention of transferring data and accumulating an approximate checksum with dedicated hardware can be implemented in the reverse direction when transferring data from a computing system to a network, either by correcting the hardware checksum value after the transfer, or by pre-programming (seeding) an appropriate correction value to the hardware in advance, based on the checksum of the header. In can also be more generally applied to any data transfers which create checksums, as will be clear to one with ordinary skill in the art. In addition, many other variations will be apparent to one skilled in the art without departing from the spirit and scope of the claimed invention.

What is claimed is:

1. A method for transferring a data packet from a source computing system to a destination computing system having a processor, said data packet having a header data portion and a user data portion, and for generating a net checksum of the user data portion of the data packet, the method comprising the steps of:

receiving, at the destination computing system, the data packet from the source computing system, and transferring the data packet to a memory of the destination computing system;

accumulating a gross checksum of data received at the destination computing system during the receipt of the data packet;

calculating a header checksum of the header data portion of the data packet; and generating the net checksum by arithmetically subtracting the header checksum from the gross checksum.

2. The method of claim 1 further comprising the step of copying the user data portion of the data packet to a page in the memory after receipt of the data packet.

3. The method of claim 1 comprising performing the receiving and accumulating steps by a network adapter independently of the processor of the destination computing system.

4. The method of claim 1 comprising performing computational tasks by the processor of the destination computing system during the steps of receiving the data packet and accumulating a gross checksum.

5. The method of claim 1 comprising performing the calculating and generating steps by the processor of the destination computing system.

6. A method for transferring a data packet from a source computing system to a destination computing system having a processor, said data packet having a header data portion with a beginning point and an ending point and a user data portion with a beginning point and an ending point, and for generating a checksum of the user data portion of the data packet, the method comprising the steps of:

receiving, at the destination computing system, a first portion of the data packet from the source computing system, and transferring the first portion of the data packet to a memory of the destination computing system;

parsing the first portion of the data packet for determining the ending point of the header data portion and the beginning point of the user data portion;

copying the user data portion of the first portion of the data packet to the beginning of a page in the memory of the destination computing system; and receiving, at the destination computing system, a remaining portion of the data packet from the source computing system, and transferring the remaining portion of the data packet to the memory of the destination computing system following the user data portion of the first portion of the data packet.

7. The method of claim 6 further comprising the steps of:

accumulating a gross checksum of data received at the destination computing system during the receipt of the data packet;

calculating a header checksum of the header data portion of the data packet; and generating a net checksum by arithmetically subtracting the header checksum from the gross checksum.

8. The method of claim 7 wherein the accumulating step is performed by a network adapter independently of the processor of the destination computing system.

9. The method of claim 6 comprising the additional step of remapping the page in memory for transferring ownership of the page to a user.

10. The method of claim 6 wherein the receiving steps are performed by a network adapter independently of the processor of the destination computing system.

11. A computing system connected to a network, the computing system comprising:

a processor;

a memory; and a network adapter which comprises:
  receiving means for receiving a data packet from the network;
  transfer means for transferring the data packet to the memory; and
  accumulating means for accumulating a gross checksum of the data in the data packet while transferring the data packet to the memory.

12. The computing system as presented in claim 11 wherein the transfer means further comprises:

storage means for storing two or more sets of start addresses and byte counts;

first transfer means for transferring a first portion of the data packet to a first address in the memory; and second transfer means for transferring a remaining portion of the data packet to a second address in the memory.

13. The computing system as recited in claim 11 further comprising:

copying means for copying a user data portion of the data packet to a page in the memory.

14. The computing system as recited in claim 11 further comprising:

correction means for calculating a header checksum of a header portion of the data packet; and generating means for calculating a net checksum by arithmetically subtracting the header checksum from the gross checksum.

15. The computing system as presented in claim 11 comprising a dedicated chip including the accumulating means for accumulating a gross checksum independently of the processor.

* * * * *